W. V. TURNER.
FLUID PRESSURE BRAKE.
APPLICATION FILED OCT. 30, 1915.
1,230,951.
Patented June 26, 1917.
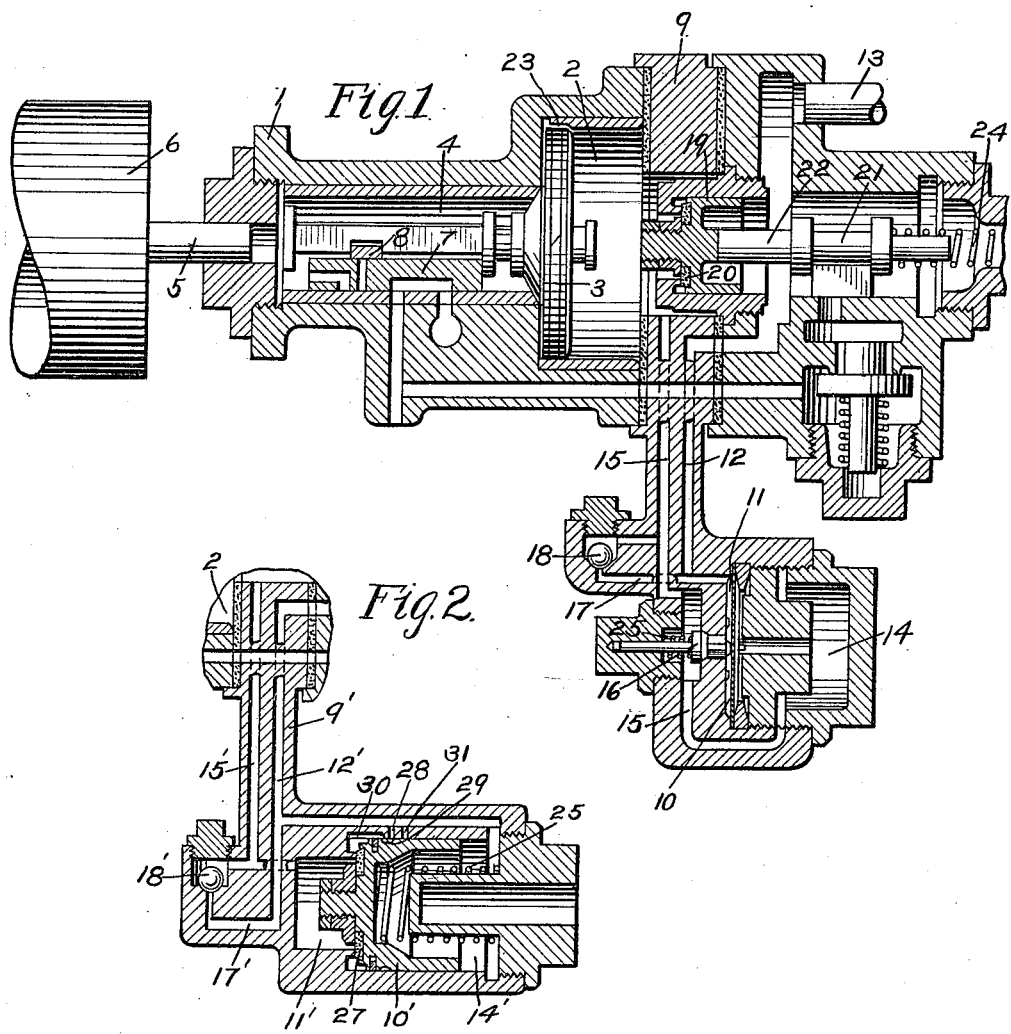
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,230,951.   Specification of Letters Patent.   Patented June 26, 1917.

Application filed October 30, 1915. Serial No. 58,780.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to a valve device operated upon a reduction in brake pipe pressure for effecting an application of the brakes.

With devices of the above character, such as a triple valve device, it sometimes happens that a light reduction in brake pipe pressure, such as may be produced by brake pipe leakage, will operate to effect the movement of the valve parts to application position and thus cause an unintended application of the brakes, or in some cases where a brake application is made by operation of the brake valve, it may be desired to delay the brake application on some part of the train, such as the locomotive, in case the locomotive brake equipment tends to produce a brake application before the brakes are applied on the train.

The principal object of my invention is to provide improved means for preventing the brakes from being applied until a predetermined reduction in brake pipe pressure is effected.

The invention also contemplates restricting the rate of flow from the brake pipe to the auxiliary reservoir or other pressure chamber, so as to reduce the possibility of overcharging the same.

In the accompanying drawing; Figure 1 is a central sectional view of a triple valve device with my improvement applied thereto; and Fig. 2 a fragmentary sectional view of a construction embodying a slightly modified form of my invention.

In the drawing, my improvement is shown applied to an ordinary triple valve device comprising a casing 1 having a piston chamber 2 containing triple valve piston 3, and having a valve chamber 4 connected by pipe 5 to auxiliary reservoir 6 and containing the usual main and graduating valves 7 and 8 adapted to be operated by piston 3.

The improved attachment may be made in the form of a filling piece 9 adapted to be secured to the triple valve casing 1 in place of the usual cap and having mounted therein a diaphragm 10, subject on one side to the pressure of a chamber 11 which is connected by passage 12 to the brake pipe 13, the chamber 14 at the opposite side of the diaphragm being connected by a passage 15 to the triple valve piston chamber 2.

The diaphragm 10 is adapted to operate a puppet valve 16 for controlling communication from the piston chamber passage 15 to the brake pipe passage 12 and a restricted charging passage 17 containing a non-return ball check valve 18 is provided for charging the piston chamber 2 and the auxiliary reservoir 6 from the brake pipe.

Where a quick action valve device is employed of the type adapted to be operated by the movement of the triple valve piston to emergency position, it is necessary to provide means for cutting off direct communication from the brake pipe to the triple valve piston chamber, and for this purpose a separating valve piston 19 may be provided. This valve piston has a seat 20 which is normally held in the position closing direct communication from the brake pipe passage 12 to the piston chamber 2 by the quick action valve device 21, to which said separating valve may be connected by a stem 22.

In operation, when fluid is supplied to the brake pipe, air flows through passage 12 and the restricted passage 17, past check valve 18 to the passage 15 and piston chamber 2, and thence through the usual feed groove 23 around the piston 3, charging the auxiliary reservoir 6.

Since the passage 17 is restricted the rate of charging is retarded and thus the possibility of over-charging the auxiliary reservoir is reduced. The fluid pressures on opposite sides of the separating valve device 19 being balanced, the same will be held seated by the quick action spring 24.

When the brake pipe pressure is reduced to effect a service application of the brakes, there will be no reduction in pressure in the piston chamber 2 until the brake pipe pressure has been reduced to a predetermined degree such that the bottled up pressure in the piston chamber 2 which acts in chamber 14 on the diaphragm 10 is able to overcome the combined forces of the reduced brake pipe pressure acting in chamber 11 and the spring 25, when the diaphragm will operate to open the valve 16 and permit the venting of fluid from the triple valve piston chamber, so that an application of the brakes is effected.

When the reduction in brake pipe pressure is stopped by lapping the brake valve, or otherwise, the fluid pressures on opposite sides of the diaphragm 10 quickly equalize and the spring 25 closes the valve 16. If a further reduction in brake pipe pressure be made, the valve 16 will be again opened after a predetermined reduction in brake pipe pressure, as in the first instance, and it will thus be evident that with the present construction, the brake pipe pressure must be reduced a predetermined amount at each successive reduction before the triple valve piston will respond.

If the brake pipe pressure be reduced at an emergency rate, the drop in pressure in the diaphragm chamber 11 will be so rapid as to cause the immediate full opening of the valve 16, so that the pressure in piston chamber 2 is suddenly reduced to effect the movement of the triple valve to emergency position. The movement of the triple valve piston 3 to emergency position then operates the quick action valve through the movement of the separating valve device 19, so as to effect a local reduction in brake pipe pressure in the usual manner.

According to the modification shown in Fig. 2 of the drawing, a piston valve 10′ is employed in place of the diaphragm, the chamber 14′ at one side being connected to the brake pipe through passage 12′ and chamber 11′ at the opposite side to piston chamber 2 through passage 15′.

The piston 10′ is provided with a seat 27 and is normally held seated by spring 25′.

When a predetermined reduction in brake pipe pressure is made, the bottled up pressure in chamber 11′ overcomes the pressure of spring 25′ and the reduced brake pipe pressure in chamber 14′ and as the piston valve 10′ moves from its seat, an increased area thereof is exposed to the pressure in chamber 11′. The valve piston then continues its movement until the increasing tension of spring 25′ balances the excess fluid pressure in chamber 11′. The point at which this balance of pressures takes place is governed by the amount of reduction which is made in brake pipe pressure. At a certain predetermined light reduction in brake pipe pressure, say five pounds, the spring 25 is so tensioned and the port 28 so positioned that the port will not be opened, but if the brake pipe reduction be slightly greater, say six pounds, then the port 28 is slightly opened, the area of the port opening being increased in proportion to the increase in the rate of reduction in brake pipe pressure.

Since the fluid in the triple valve piston chamber is reduced through a small port, the opening of which is delayed, as above described, the application of the brakes is retarded.

In order to provide for the escape of fluid leaking past the valve piston 10′ when the same is seated, a groove 30 connects the outer annular chamber of the valve piston through annular groove 29 with port 28. It will thus be seen that when the brake pipe reduction exceeds the predetermined minimum of five pounds or whatever pressure is fixed upon fluid is vented from the triple valve piston chamber at a slow rate to cause a service application of the brakes, the port 28 being small enough to prevent the bottled up fluid in the triple valve piston chamber from escaping to the brake pipe fast enough to produce undesired quick action.

Upon an emergency reduction in brake pipe pressure, the drop in brake pipe pressure is so rapid that the piston valve is caused to move its extreme traverse and a port 31 in addition to the port 28 is uncovered, so that the pressure in the triple valve piston chamber is rapidly reduced and the piston is shifted to emergency position to effect an emergency application of the brakes.

The present improvement is particularly desirable for use on locomotives equipped with a controlling valve device of the type employing an application chamber, such as shown in Patent No. 1,109,715, dated September 8, 1914. In such constructions, the equalizing valve device corresponds with the usual triple valve device but supplies fluid to the application chamber instead of directly to the brake cylinder for applying the brakes. The application chamber, however, has atmospheric pressure at the start, while the usual brake cylinder in release has no volume and therefore contains no air, so that when a brake application is made, the effect of a light reduction in brake pipe pressure will be felt on the locomotive before it is effective on the train. By employing the present improvement, the action of the equalizing valve device is delayed and consequently the brakes are applied on the engine more nearly in unison with those on the cars.

Having now described my invention, what I claim as new and desire to secure by Letters Patent, is:

1. In a fluid pressure brake, the combination with a brake pipe and a valve device having a piston chamber charged from the brake pipe and operated upon a reduction in pressure therein for effecting an application of the brakes, of means constantly subject to the opposing pressures of the brake pipe and said chamber and adapted upon a predetermined reduction in brake pipe pressure for opening communication from the brake pipe to said valve device.

2. In a fluid pressure brake, the combination with a brake pipe and a valve device having a piston chamber charged from the brake pipe and operated upon a reduction in brake pipe pressure for effecting an application of the brakes, of means constantly subject to the opposing pressures of the brake pipe and said chamber and normally closing communication for venting fluid from said valve device to the brake pipe and adapted upon a predetermined reduction in brake pipe pressure to open said communication.

3. In a fluid pressure brake, the combination with a brake pipe, of valve means and a piston operated upon a reduction in brake pipe pressure for actuating said valve means to effect an application of the brakes, and means for controlling a restricted communication from the piston chamber of said piston to the brake pipe and operated upon a predetermined reduction in brake pipe pressure for opening said communication to an extent varying according to the rate of reduction in brake pipe pressure for effecting a reduction in pressure in said piston chamber.

4. In a fluid pressure brake, the combination with a brake pipe and a valve device having a piston chamber and operated upon a reduction in brake pipe pressure for effecting an application of the brakes, of a movable abutment subject to the opposing pressures of the brake pipe and said piston chamber and operated upon a predetermined reduction in brake pipe pressure for opening a restricted communication for venting fluid from said piston chamber.

5. In a fluid pressure brake, the combination with a brake pipe and a valve device having a piston chamber normally supplied with fluid from the brake pipe and operating upon a reduction in brake pipe pressure for effecting an application of the brakes, of a movable abutment subject to the opposing pressures of the brake pipe and said piston chamber and adapted upon a predetermined reduction in brake pipe pressure to open a restricted communication for venting fluid from said piston chamber to the brake pipe.

6. In a fluid pressure brake, the combination with a brake pipe and a valve device having a piston chamber charged with fluid from the brake pipe for effecting an application of the brakes upon a reduction in pressure in said chamber, of a movable abutment subject on one side to the pressure in said chamber and on the opposite side to brake pipe pressure and the pressure of a spring and a port controlled by said abutment for venting fluid from said chamber to the brake pipe.

7. In a fluid pressure brake, the combination with a brake pipe and a valve device having a piston chamber charged with fluid from the brake pipe for effecting an application of the brakes upon a reduction in pressure in said chamber, of a movable abutment subject on one side to the pressure in said chamber and on the opposite side to brake pipe pressure and the pressure of a spring and a port controlled by said abutment and adapted to open and vent fluid from said chamber to the brake pipe only upon movement of said abutment to a position where the pressure in the piston chamber exceeds the combined brake pipe pressure and that of the spring.

8. In a fluid pressure brake, the combination with a brake pipe and a valve device having a piston chamber charged with fluid from the brake pipe for effecting an application of the brakes upon a reduction in pressure in said chamber, of a normally seating valve piston subject on one side to the pressure of said chamber and on the opposite side to brake pipe pressure and the pressure of a spring and adapted upon a predetermined reduction in brake pipe pressure to first unseat and then move to a position for opening a port for venting fluid from said chamber to the brake pipe.

9. In a fluid pressure brake, the combination with a brake pipe and a valve device having a piston chamber charged with fluid from the brake pipe for effecting an application of the brakes upon a reduction in pressure in said chamber, of a valve piston subject to the pressure of said chamber on one side and to the pressure of a spring and brake pipe pressure on the opposite side and normally seated exposing a restricted area to the pressure of said chamber and a restricted port controlled by said valve piston and adapted to be opened upon a predetermined movement of said valve piston from its seat for venting fluid from said chamber to the brake pipe.

In testimony whereof I have hereunto set my hand.

WALTER V. TURNER.

Copies of this patent may be obtained for five cents each, by addressing the "Commissioner of Patents, Washington, D. C."